United States Patent
Hagner et al.

(10) Patent No.: US 8,352,158 B2
(45) Date of Patent: Jan. 8, 2013

(54) METHOD AND SYSTEM FOR COMPENSATING ENGINE THERMAL CONDITIONS

(75) Inventors: Dave G. Hagner, Beverly Hills, MI (US); Mrdjan J. Jankovic, Birmingham, MI (US); Marcus William Fried, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/301,443

(22) Filed: Nov. 21, 2011

(65) Prior Publication Data

US 2012/0143476 A1    Jun. 7, 2012

(51) Int. Cl.
  *B60T 7/12* (2006.01)
(52) U.S. Cl. .......................... 701/103; 123/434; 123/672
(58) Field of Classification Search .......... 701/103–105, 701/108, 114, 115; 123/434, 672, 698
  See application file for complete search history.

(56) References Cited

U.S. PATENT DOCUMENTS

| | | | |
|---|---|---|---|
| 5,522,365 A | | 6/1996 | Milunas et al. |
| 5,715,796 A | * | 2/1998 | Suzuki et al. .................. 123/492 |
| 5,794,604 A | * | 8/1998 | Suzuki et al. .................. 123/673 |
| 6,227,182 B1 | | 5/2001 | Muraki et al. |
| 6,662,640 B2 | | 12/2003 | Yagi |
| 6,983,737 B2 | | 1/2006 | Gross et al. |
| 6,999,864 B2 | * | 2/2006 | Iizuka et al. .................. 701/103 |
| 7,640,899 B2 | * | 1/2010 | Lewis et al. ................. 123/90.11 |
| 7,823,548 B2 | * | 11/2010 | Winstead et al. .......... 123/90.11 |
| 8,150,597 B2 | * | 4/2012 | Yamakawa et al. ........... 701/103 |

* cited by examiner

*Primary Examiner* — John Kwon
(74) *Attorney, Agent, or Firm* — Julia Voutyras; Alleman Hall McCoy Russell & Tuttle LLP

(57) ABSTRACT

A method for compensating for thermal transient conditions of an engine that can cause valve growth or contraction is disclosed. In one example, the method provides cylinder air amount compensation during non-blow-through and blow-through conditions. The approach may improve cylinder air amount estimates, thereby improving engine emissions.

19 Claims, 6 Drawing Sheets

METHOD AND SYSTEM FOR COMPENSATING ENGINE THERMAL CONDITIONS

BACKGROUND/SUMMARY

Direct acting mechanical bucket (DAMB) valve actuators may be produced with no valve lash adjustment. As such, DAMB operated valves may respond quickly, however, temperature changes occurring within the engine having DAMB operated valves may cause expansion or contraction of valves resulting in changes to valve event timing. For example, a change in engine load can cause engine temperatures and pressures to increase. The increased cylinder temperature can cause exhaust valve expansion. Further, the cylinder head may also expand, and the exhaust valve expansion rate may be different from the cylinder head expansion rate because the exhaust valve and the cylinder head may be formed from different materials or because the exhaust valves are cooled differently from the cylinder head. The temperature changes in the cylinder may cause changes in valve stem length and valve diameter. As a result, valve timing changes may occur by way of a valve opening and/or closing at different times as valve temperature and cylinder head temperature change. Consequently, volumetric efficiency of the engine may change during transient engine operating conditions where valve and/or cylinder head temperatures change due to changes in engine operating conditions.

The inventors herein have recognized the above-mentioned disadvantages and have developed a method of compensating for thermal conditions during transient engine conditions, comprising: adjusting an engine air amount parameter and a cylinder residual gas amount via an engine MAP and cylinder air amount volumetric efficiency relationship in response to a rate of change of cylinder air amount; and adjusting output of an engine actuator in response to the engine air amount parameter.

By adjusting cylinder air amount and a cylinder residual gas amount via an engine manifold absolute pressure (MAP) and cylinder air amount volumetric efficiency relationship in response to a rate of change of cylinder air amount, it may be possible to account for valve temperatures that can affect engine volumetric efficiency. The change of cylinder air amount may be indicative of a valve temperature change so that cylinder air amount and cylinder residual gas may be compensated until the engine reaches an equilibrium temperature where the MAP and cylinder air amount relationship may be used without compensation.

The present description may provide several advantages. In particular, the approach can reduce vehicle emissions by providing improved engine air-fuel control. Further, the approach may also reduce engine misfires and/or slow combustion events which also may increase engine emissions. Further still, the approach provides a simple way to compensate cylinder air amount and cylinder exhaust residuals during transient engine operating conditions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
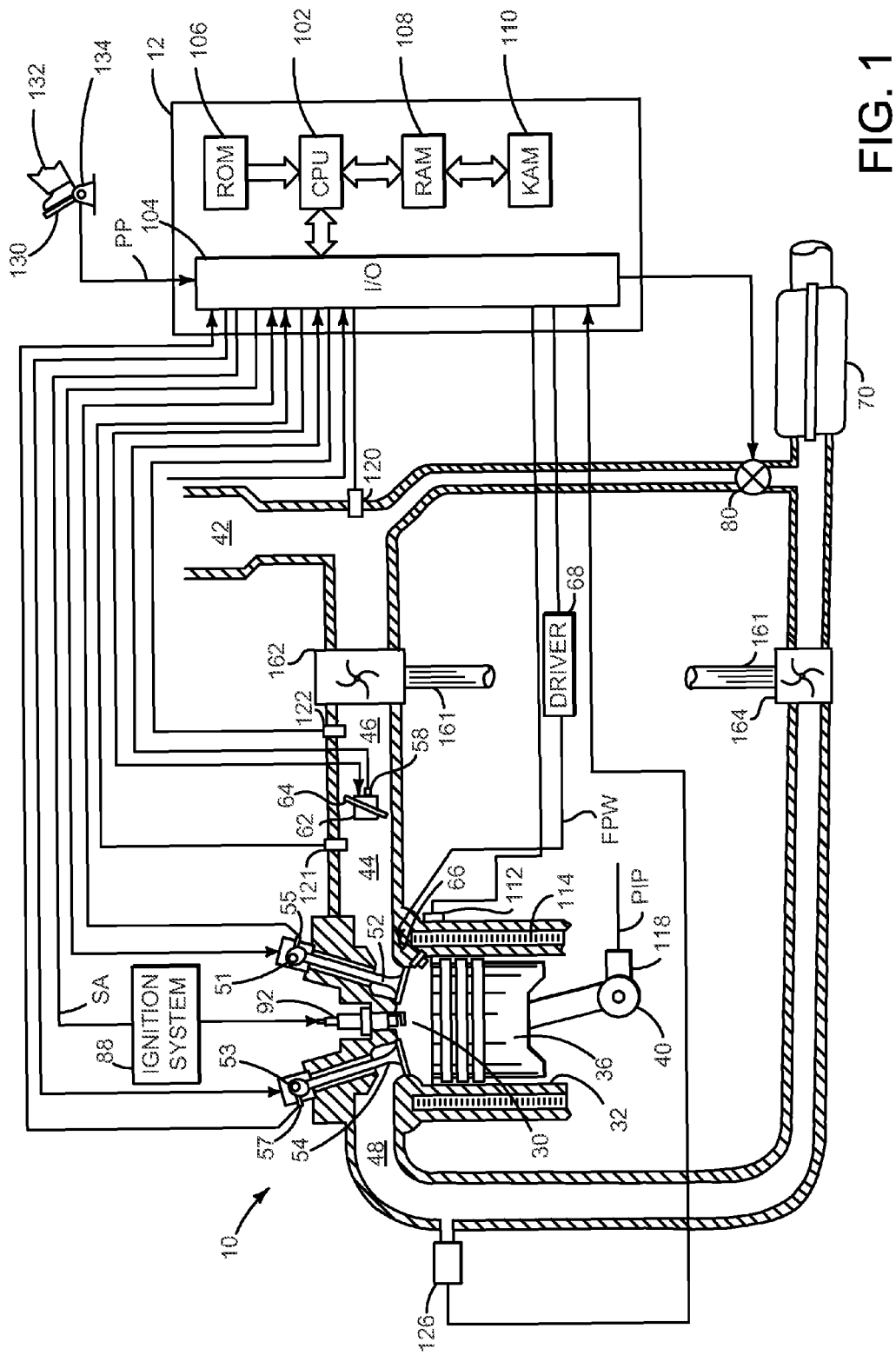
FIG. 1 shows a schematic depiction of an engine.
Figure 2:
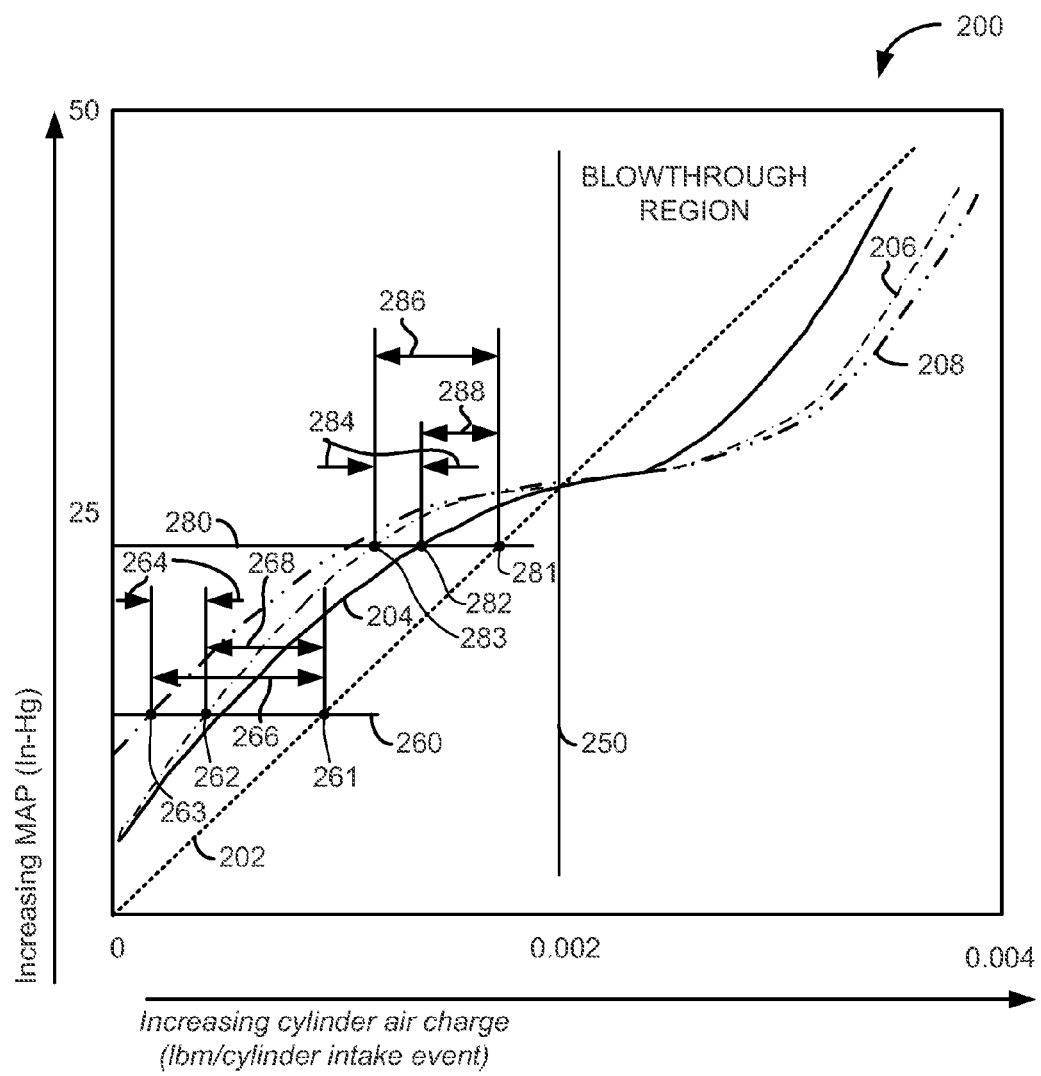
FIG. 2 shows a plot of simulated error on cylinder air amount, residual gas, and blow-through air caused by valve temperature related to transient engine operating conditions.

The present description is directed to adjusting cylinder air amount and cylinder residual gas amount of a cylinder of an engine. FIG. 1 shows one example system for adjusting cylinder air amount of a cylinder. In some examples, the system may include a turbocharger with a spark ignited mixture of air and gasoline, alcohol, or a mixture of gasoline and alcohol. However, in other examples, the engine may be a compression ignition engine, such as a diesel engine. FIG. 2 shows a simulated example plot of curves that are the basis for compensating cylinder air amount and cylinder residual amount.

Figure 3:
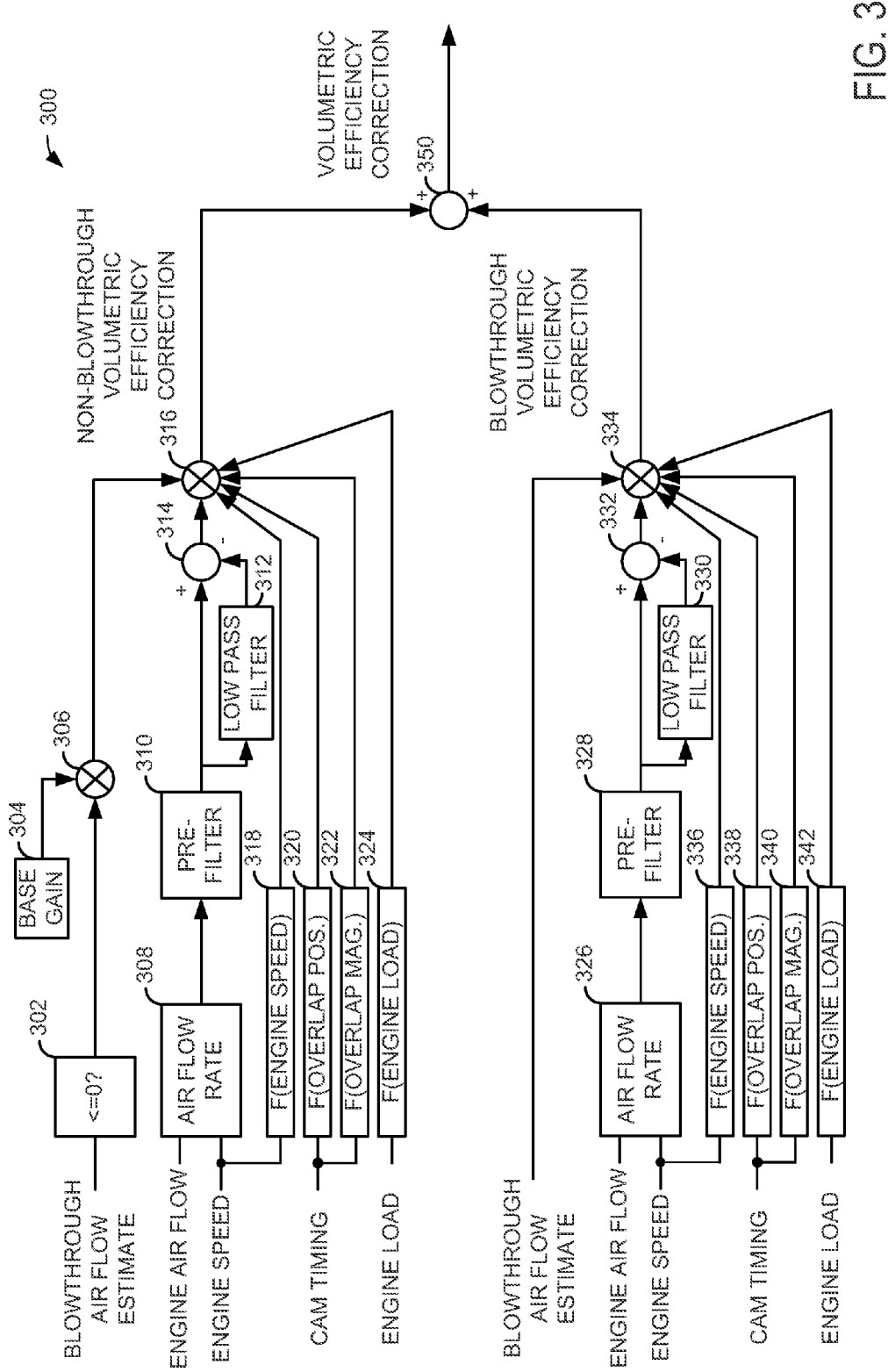
FIG. 3 shows a high level block diagram of a method for compensating valve temperature.
Figure 4:
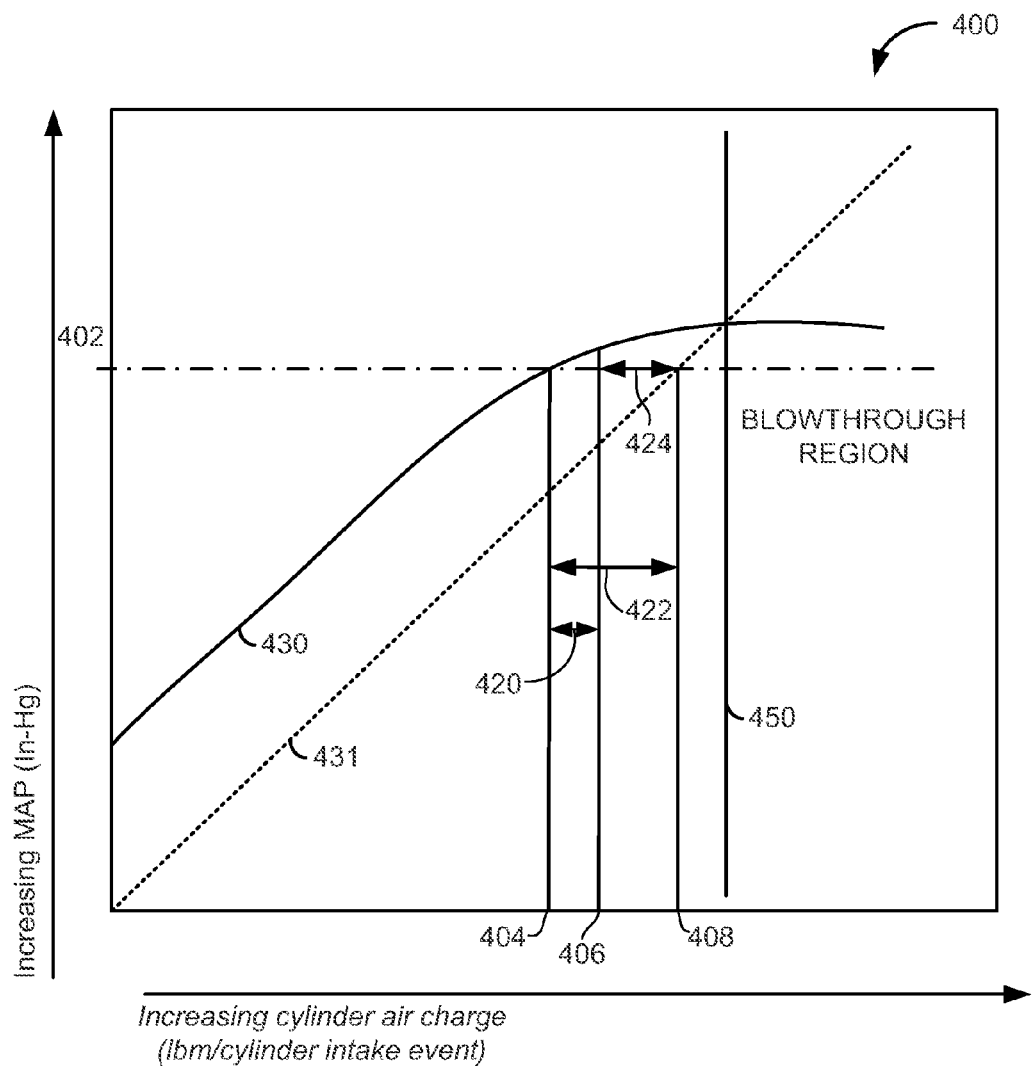
FIG. 4 shows a plot illustrating compensation for cylinder volumetric efficiency impacting cylinder air amount and cylinder exhaust gas dilution as determine from MAP.
Figure 5:
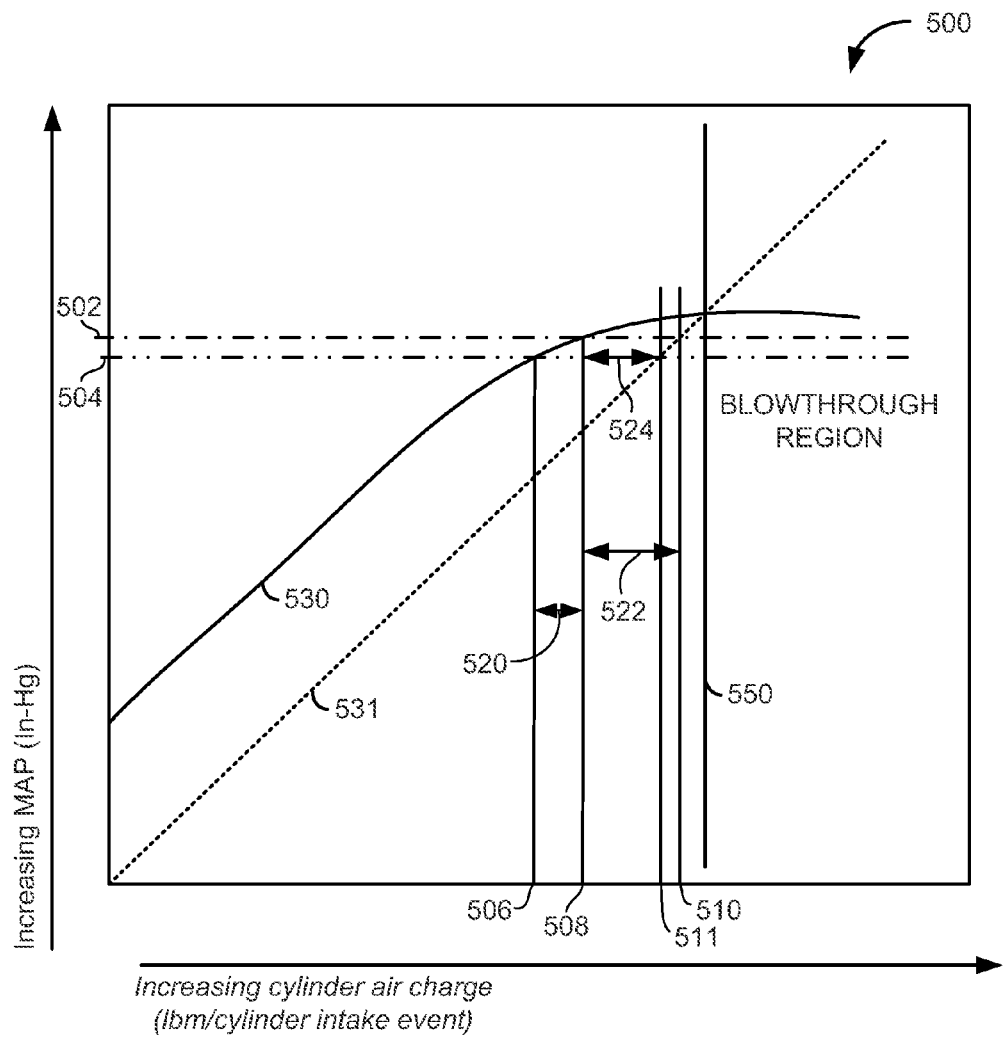
FIG. 5 shows a plot illustrating compensation for cylinder volumetric efficiency impacting inferred manifold pressure as determined from MAF.
Figure 6:
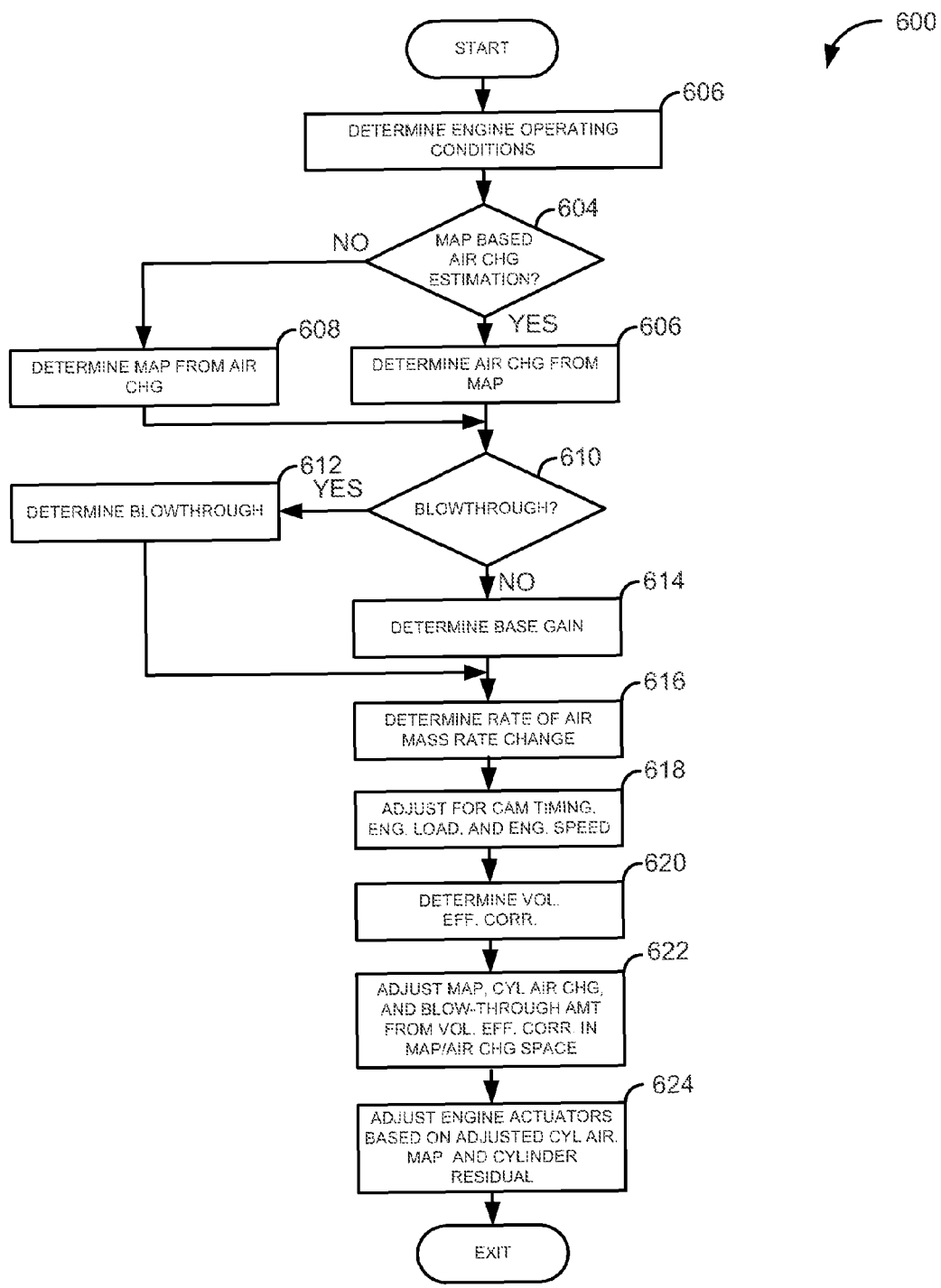
FIG. 6 shows a flowchart of an example method compensating for exhaust valve timing changes during transient conditions.

FIG. 3 shows an example method for adjusting cylinder air amount. Visual examples of how cylinder air amount, MAP, and cylinder residual amount are adjusting according to the method disclosed herein are shown in FIGS. 4-5. A flowchart of a method for adjusting cylinder air amount and cylinder residual gas amount is shown in FIG. 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 62 which adjusts a position of throttle plate 64 to control air flow from intake boost chamber 46.

Exhaust gases spin turbocharger turbine 164 which is coupled to turbocharger compressor 162 via shaft 161. Compressor 162 draws air from air intake 42 to supply boost chamber 46. Thus, air pressure in intake manifold 44 may be elevated to a pressure greater than atmospheric pressure. Consequently, engine 10 may output more power than a normally aspirated engine.

Distributorless ignition system 88 provides an ignition spark to combustion chamber 30 via spark plug 92 in response to controller 12. Ignition system 88 may provide a single or multiple sparks to each cylinder during each cylinder cycle. Further, the timing of spark provided via ignition system 88 may be advanced or retarded relative to crankshaft timing in response to engine operating conditions.

Universal Exhaust Gas Oxygen (UEGO) sensor 126 is shown coupled to exhaust manifold 48 upstream of exhaust gas after treatment device 70. Alternatively, a two-state exhaust gas oxygen sensor may be substituted for UEGO sensor 126. In some examples, exhaust gas after treatment device 70 is a particulate filter and/or a three-way catalyst. In other examples, exhaust gas after treatment device 70 is solely a three-way catalyst.

Exhaust gases may be routed from downstream of turbine 164 to upstream of compressor 162 via exhaust gas recirculation (EGR) valve 80. In another example, exhaust gases may be routed from upstream of turbine 164 to downstream of compressor 162. Further, engine combustion chamber 30 may contain residual exhaust from a prior combustion event that remains in combustion chamber during a subsequent cylinder cycle. Thus, combustion chamber 30 may include internal (e.g., exhaust gases that remain in the cylinder from one combustion event to the next) EGR and external EGR via EGR valve 80.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a knock sensor for determining ignition of end gases (not shown); a measurement of engine manifold pressure (MAP) from pressure sensor 121 coupled to intake manifold 44; a measurement of boost pressure from pressure sensor 122 coupled to boost chamber 46; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

Turbocharged and supercharged engines pressurize air entering an engine so that engine power may be increased. The pressurized air provides for an increased cylinder air charge during a cycle of the engine as compared to a naturally aspirated engine. Further, the cylinder fuel charge can be increased as the cylinder air charge is increased to increase the amount of energy produced when the fuel is combusted with the air during a cycle of the cylinder. However, during periods of valve overlap where both intake and exhaust valves of a cylinder are simultaneously open, it is possible for air to pass directly from the engine intake manifold to the engine exhaust manifold without participating in combustion within a cylinder. Air passing directly from the intake manifold to the exhaust manifold without participating in combustion may be referred to as blow-through.

Thus, the system of FIG. 1 provides for an engine system, comprising: an engine; a turbocharger coupled to the engine; and a controller including instructions for adjusting an engine air amount parameter and a cylinder residual gas amount in response to a rate of change of cylinder air amount flow during blow-through and non-blow-through engine operating conditions, the controller including further instructions for adjusting an actuator in response to the engine air amount parameter. Thus, the system provides compensation for both blow-through and non-blow-through conditions.

The engine system further comprises adjusting a residual gas amount based on the adjusted engine air amount parameter. The engine system also includes where the rate of change of cylinder air amount flow is determined from a difference between engine air flow and filtered engine air flow. The engine system further comprises additional instructions for adjusting the engine air amount parameter in response to cam timing. The engine system further comprises additional instructions for adjusting the engine air amount parameter in response to engine speed and engine load. In another example, the engine system further comprises additional instructions to determine blow-through during cylinder air flow conditions where cylinder air flow is greater than a cylinder air flow at an intersection of a maximum volumetric efficiency curve and a non-blow-through curve.

Referring now to FIG. 2, a plot of simulated error on cylinder air amount, residual gas, and blow-through air caused by transient thermal engine operating conditions is shown. The X axis of plot 200 represents air mass amount of a cylinder per cylinder intake event or cylinder cycle. Air mass amount increases from the left side of the plot to the right side of the plot. The Y axis of plot 200 represents engine intake manifold absolute pressure (MAP) and MAP increase from the bottom of the origin of the plot in a direction of the Y axis. Vertical marker 250 represents a cylinder air amount where air blow-through occurs if cylinder air amount increases to the right of vertical marker 250, and where air blow-through does not occur to the left of vertical marker 250. Vertical marker 250 passes through the intersection of curves 202 and 206 which may be used to identify blow-through conditions via comparing cylinder air flow to the air flow at the intersection of curves 202 and 206

Curve 202 represents the theoretical maximum air amount (e.g., 100% volumetric efficiency) that the cylinder can hold at a given pressure at intake valve closing (IVC). Thus, the cylinder mass amount increases linearly as the cylinder pressure increases. In one example, the maximum air amount that the cylinder can hold may be characterized as a slope of a line where the slope is described as:

$$\text{Slope} = \frac{1}{(1-r_{pb})c_{norm}}$$

where variable $c_{norm}$ accounts for physical properties of air, intake manifold temperature, and cylinder displacement. Variable $r_{pb}$ is an effective pushback ratio characterizing a portion of a cylinder mixture that may be pushed into the engine intake manifold from the cylinder as the piston moves in a direction toward the cylinder head while the intake valve is open. The pushback ratio may be determined as the greater of a constant multiplied by the physical ratio of cylinder volume displaced by the piston moving from bottom dead center (BDC) to the intake valve closing (IVC) point, to the total cylinder displacement volume of the cylinder and the pushback ratio computed from engine mapping as:

$$1 - \frac{1}{c_{norm} * \text{air\_slope}}$$

where air_slope is the least-squares linear fit of the manifold pressure vs. trapped air amount data excluding blow-through data points.

Curve 204 represents a cylinder air amount vs. MAP volumetric efficiency relationship during cold engine operating conditions where engine and/or cylinder valve temperature are less than at nominal (e.g. steady-state) engine operating conditions. During cool conditions, cylinder valves may expand less than during conditions where the engine is operating at nominal engine temperature (e.g., 90° C.). As a result, exhaust gas residuals held in a cylinder after a compression stroke of the cylinder and into a subsequent compression stroke of the cylinder may decrease as compared to nominal engine operating conditions.

Curve 206 represents a cylinder air amount vs. MAP volumetric efficiency relationship during nominal mapped engine operating conditions that are stored in controller memory where engine temperature and cylinder valve temperature have time to stabilize. In particular, curve 206 represents steady state engine speed and load conditions.

Curve 208 represents a cylinder air amount vs MAP volumetric efficiency relationship during warm engine operating conditions where engine and/or cylinder valve temperature are greater than at nominal engine operating conditions. During warm conditions, cylinder valves may expand more than during conditions where the engine is operating at nominal engine temperature. Consequently, exhaust gas residuals held in a cylinder after an intake stroke of the cylinder and into a subsequent compression stroke of the cylinder may increase as compared to nominal engine operating conditions.

It can be seen that curve 206 exhibits a lower cylinder air amount for an equivalent MAP as compared to curve 202 for cylinder air amounts less than or to the left of vertical marker 250. The lower cylinder air amount may be attributed to residual exhaust gases remaining in the cylinder from a previous combustion event.

The engine controller includes a function or table containing values that represent curves 206 and 202. The engine controller may also contain curves 208 and 204 as well as curves for other engine temperatures; however, storing and retrieving additional curves can complicate, slow down, and increase the cost of the controller. In addition, relationship between the cylinder air amount and MAP represented by the curves 204 and 208 can only be observed during large transients, which makes their characterization more difficult compared to the nominal relationship described by curve 206. Therefore, it can be beneficial to compensate curve 206 for the conditions that provide curves 204 and 208 according to the methods of FIGS. 3 and 6. Thus, cylinder air amount and cylinder residual gas amount can be determined by interpreting curve 206 and adjusting for the engine operating conditions so as to follow curves 204 and 208.

Two examples are provided to illustrate how valve and engine temperature affect cylinder air amount and cylinder exhaust gas residual amount. Similar relationships occur to the right of vertical marker 250 between curves 202 and 208; however, the distance between curve 202 and curves 204-208 represent different amounts of blow-through air (e.g., air that blows through a cylinder when intake manifold pressure is greater than exhaust pressure while intake and exhaust valves of a cylinder are simultaneously open).

Horizontal marker 260 represents a first constant intake manifold pressure. Horizontal marker 260 intersects curve 202 at 261. If a vertical line is extended from 261 to the X axis, a cylinder air amount may be determined at the intersection of the vertical line and the X axis. Cylinder air amount at 261 represents a condition of 100% cylinder volumetric efficiency (e.g., the theoretical amount of air a cylinder can hold) when the engine is operated at a MAP of horizontal marker 260 and at the nominal air temperature. Cylinder air amount at 262 represents cylinder air amount at nominal engine operating conditions where the relationship between MAP and cylinder air amount is mapped. If a vertical line is extended from 262 to the X axis, cylinder air amount for nominal mapped conditions may be determined at the intersection of the vertical line and the X axis. Cylinder air amount at 263 represents cylinder air amount at warm engine operating conditions where the relationship between MAP and cylinder air amount is compensated by the methods of FIGS. 3 and 6. If a vertical line is extended from 263 to the X axis, cylinder air amount for warm conditions may be determined at the intersection of the vertical line and the X axis.

The distance between arrows 264 represents a difference in cylinder air amount between nominal engine mapping conditions and warm engine operating conditions at MAP level 260. In particular, when the engine is operated warm at low load conditions (warmer than steady-state operating temperatures for this condition), cylinder air amount is over estimated because cylinder air amount at nominal engine operating conditions (e.g., 262) is greater cylinder air amount at warm operating conditions (e.g., 263). Thus, cylinder air amount will be overestimated via mapped curve 206 unless compensation is provided to adjust cylinder air amount to 263 during warm engine operating conditions.

Distance 266 represents an amount of exhaust gas residuals in a cylinder during a cycle of the cylinder for warm engine operating conditions when MAP is at the level of horizontal marker 260. The amount of exhaust gas residuals in a cylinder for warm engine operating conditions can be determined at the MAP level of 260 via subtracting the cylinder air mass at 263 of warm volumetric efficiency curve 208 of from the cylinder air mass at 261 of maximum volumetric efficiency curve 202. Distance 268 represents an amount of exhaust gas residuals in a cylinder during a cycle of the cylinder for nominal engine operating conditions. The amount of exhaust gas residuals in a cylinder for nominal operating conditions at MAP level 260 can be determined via subtracting the cylinder air mass at 262 of nominal volumetric efficiency curve 206 from the cylinder air mass at 261 of maximum volumetric efficiency curve 202.

Horizontal marker 280 represents a second constant MAP. Horizontal marker 280 intersects maximum volumetric efficiency curve 202 at 281. If a vertical line is extended from 281 to the X axis, a cylinder air amount may be determined at the intersection of the vertical line and the X axis. Cylinder air amount at 281 represents a condition of 100% cylinder volumetric efficiency when the engine is operated at a MAP of horizontal marker 280. Cylinder air amount at 282 represents cylinder air amount at cold engine operating conditions where the relationship between MAP and cylinder air amount is compensated by the methods of FIGS. 3 and 6. If a vertical line is extended from 282 to the X axis, cylinder air amount for cold conditions may be determined at the intersection of the vertical line and the X axis. Cylinder air amount at 283 represents cylinder air amount at nominal engine operating conditions where the relationship between MAP and cylinder air amount is mapped. If a vertical line is extended from 283 to the X axis, cylinder air amount for nominal mapped conditions may be determined at the intersection of the vertical line and the X axis.

The distance between arrows 284 represents a difference in cylinder air amount between nominal engine mapping conditions and cold engine operating conditions when MAP is at 280. In particular, when the engine is operated cold at medium load conditions, cylinder air amount is under estimated because cylinder air amount at nominal engine operating conditions (e.g., 283) is less than cylinder air amount at cold operating conditions (e.g., 282). Thus, cylinder air amount will be underestimated via curve 206 unless compensation is provided to adjust cylinder air amount to 283 during cold engine operating conditions.

Distance 286 represents an amount of exhaust gas residuals in a cylinder during a cycle of the cylinder for nominal engine operating conditions when MAP is at the level of horizontal marker 280. The amount of exhaust gas residuals in a cylinder for nominal engine operating conditions can be determined via subtracting the cylinder air mass at 283 of nominal volumetric efficiency curve 206 from the cylinder air mass at 281 of maximum volumetric efficiency curve 202. Distance 288 represents an amount of exhaust gas residuals in a cylinder during a cycle of the cylinder for cold engine operating conditions. The amount of exhaust gas residuals in a cylinder for cold operating conditions can be determined via subtracting the cylinder air mass at 282 of cold volumetric efficiency curve 204 from the cylinder air mass at 281 of nominal volumetric efficiency curve 202.

Thus, it can be observed from FIG. 2 that when cylinder air amount is estimated according to curve 202, cylinder air amount will be underestimated when the engine and valves are cold if compensation is not provided. Further, it can be observed that the exhaust gas residual amount estimated in a cylinder will be overestimated when the engine and valves are cold if compensation is not provided. Similarly, cylinder air amount will be overestimated when the engine and valves are warmer than nominal conditions if compensation is not provided. Additionally, the exhaust gas residual amount estimated in a cylinder will be underestimated when the engine and valves are warmer than nominal conditions if compensation is not provided.

Referring now to FIG. 3, a high level block diagram of a method for compensating valve temperature is shown. The method of FIG. 3 may be implemented via instructions in a controller of a system as shown in FIG. 1.

At 302, method 300 judges whether or not a condition of blow-through exits. In one example, method 300 may judge that blow-through exists when air flow into a cylinder exceeds a cylinder air amount described by a maximum cylinder volumetric efficiency curve (e.g., to the right of vertical marker 250 of FIG. 2). If a blow-through estimate is determined to be less than or equal to zero (e.g., a non-blow-through condition), a value of one is output at 302. Otherwise, if the blow-through estimate is determined to be greater than zero, a value of zero is output at 302.

At 304, a base non-blow-through gain is determined. The base gain amount may be empirically determined and stored in a table that is indexed by engine speed, engine load, and engine temperature. The output of 304 and 302 are multiplied at junction 306.

At 308, engine air flow and engine speed are used to determine air flow rate. In one example, air flow rate is determined by integrating engine air flow during a selected engine rotation interval (e.g., one cylinder cycle) and multiplying the result by an engine speed factor (e.g., conversion from engine speed to cylinder strokes) to determine cylinder air amount per cylinder stroke. In other examples, an air flow rate in other units may be provided. An air flow rate is directed from 308 to 310.

At 310, method 300 filters the air flow rate output of 308. In one example, a low pass filter with a higher cut-off frequency may be applied to the air flow rate. The filtered air flow rate is directed to summing junction 314 and low pass filter 312. Low pass filter 312 may be a first-order or higher order filter. Low pass filter 312 may include an adjustable time constant that is based on engine operating conditions. For example, low pass filter 312 may have a first time constant at lower engine temperatures and a second time constant for higher engine temperatures.

At 314, method 300 subtracts the low pass filtered air flow rate from the non-low pass filtered air flow rate. Subtracting the low pass filtered air flow rate from the air flow rate provides a rate of change of air flow rate. The rate of change in the air flow rate is directed to 316.

At 318, engine speed indexes a function of empirically determined gain that accounts for an engine speed dependency in the air amount adjustment for changes in engine temperature. The output of 318 is directed to 316.

At 320, engine speed indexes a function of empirically determined gain that accounts for engine valve overlap relative to top-dead-center exhaust stroke. The output of 320 is directed to 316.

At 322, engine speed indexes a function of empirically determined gain that accounts for engine valve overlap duration. The output of 322 is directed to 316.

At 324, engine speed indexes a function of empirically determined gain that accounts for an engine load dependency in the air amount adjustment for changes in engine temperature. The output of 324 is directed to 316.

At 316, the outputs of 306, 314, 318, 320, 322, and 324 are multiplied together to provide a non-blow-through volumetric efficiency correction. Thus, if the output of 302 is a value of one, a value other than zero may be output from 316. If the output of 302 is zero, non-blow-though compensation is not provided. In this way, the non-blow-through volumetric efficiency can be zeroed when blow-through occurs.

For the blow-through volumetric efficiency correction, the blow-through air estimate is passed directly to 334. The blow-though air may be determined as described above.

At 326, engine air flow and engine speed are used to determine air flow rate as described at 308. An air flow rate is directed from 326 to 328. At 328, method 300 filters the air flow rate output of 326 as described at 310. However, a different filter and/or filter time constant may be provided at 328. The filtered air flow rate is directed to summing junction 332 and low pass filter 330. Low pass filter 330 may be a first-order or higher order filter as described at 312. However, low pass filter 330 may have a time constant that is different from the time constant of low pass filter 312.

At 332, method 300 subtracts the low pass filtered air flow rate from the non-low pass filtered air flow rate. Subtracting the low pass filtered air flow rate from the air flow rate provides a rate of change of air flow rate. The rate of change in the air flow rate is directed to 334.

At 336, engine speed indexes a function of empirically determined gain that accounts for an engine speed dependency in the air amount adjustment for changes in engine temperature. The values at 336 may be different than the values at 318. The output of 336 is directed to 334.

At 338, engine speed indexes a function of empirically determined gain that accounts for engine valve overlap. The values at 338 may be different than the values at 320. The output of 338 is directed to 334.

At 340, engine speed indexes a function of empirically determined gain that accounts for engine valve overlap duration. The values at 340 may be different than the values at 322. The output of 340 is directed to 334.

At 342, engine load indexes a function of empirically determined gain that accounts for an engine load dependency in the air amount adjustment for changes in engine temperature. The values at 342 may be different than the values at 324. The output of 342 is directed to 334.

At 334, the blow-through air estimate and the outputs of 332, 336, 338, 340, and 342 are multiplied together to provide a blow-through volumetric efficiency correction. Thus, if the blow-through amount is non-zero, a value other than zero may be output from 334. If the blow-through amount is zero, blow-though compensation is not provided. In this way, the blow-through volumetric efficiency correction can be output when blow-through occurs.

At 350, the blow-through volumetric efficiency correction and the non-blow-through volumetric efficiency correction amounts are summed. However, because of the way method 300 is structured, either the blow-through compensation or the non-blow-through compensation will be zeroed out so that only blow-through or non-blow-through compensation is provided. The output of 350 is directed to an engine air amount parameter compensation method where an engine air amount parameter (e.g., cylinder air amount or blow-through air amount) and cylinder residual exhaust gases are determined via curves similar to curves 202 and 206 of FIG. 2. In particular, if MAP is known, cylinder air amount is determined by indexing a function similar to that of FIG. 2 with MAP and the cylinder air amount value output is then added with the compensation output of 350. The exhaust gas residual is determined by subtracting the cylinder air amount from the maximum cylinder air amount at a MAP value as described with regard to FIG. 2 via curve 202. In this way, the cylinder air amount and residual exhaust amount may be determined. Further, the cylinder air amount reduction or increase is phased out as time increases from the transient condition. The phase out of cylinder air amount change emulates conditions of a valve thermal transient.

In other examples, where cylinder air mass is measured, MAP may be determined via indexing a table or function similar to FIG. 2 which outputs MAP for the determined cylinder air amount. The residual gas amount may be determined as previously described.

Referring now to FIG. 4, a plot illustrating thermal compensation for cylinder volumetric efficiency impacting cylinder air amount and cylinder exhaust gas dilution is shown. The method described herein is executable via instructions of a controller in a system such as in FIG. 1 and useful for systems that measure mass air flow and is included in the method of FIG. 6.

The X axis represents cylinder air amount and cylinder air amount increases from the left side of the plot to the right side of the plot. The Y axis represents MAP and MAP increases from the X axis in the direction of the Y axis arrow. Vertical marker 450 indicates where air blow-through can occur. Specifically, blow-through can occur when cylinder air flow is greater than or to the right of the level indicated by vertical marker 450. Blow-thorough is not present during cylinder air flows that are to the left of vertical marker 450.

In the example of FIG. 4, volumetric efficiency compensation for valve temperature changes during a load change from a lower load to a higher load where valve temperature increases is shown. In this example, the cylinder air amount increases due to compensation for increasing valve temperature.

Further in this example, cylinder air amount increases from a low level to the level shown by vertical marker 404. Vertical marker 404 represents a mapped base cylinder air amount that is uncompensated and determined via a MAP sensor, for example. Cylinder air amount may be estimated at a level shown by vertical marker 404 by indexing a table or function via MAP at the level of 402 to output cylinder air amount at the level 404 according to curve 430 (e.g. a mapped non-blow-through curve describing cylinder volumetric efficiency based on MAP and cylinder air amount). The base estimated cylinder exhaust gas dilution is determined as the difference between the value of curve 430 at 404 and the value of curve 431 at 408, where curve 431 represents the maximum level or theoretical cylinder volumetric efficiency. The base estimated cylinder exhaust gas dilution is indicated by arrow 422.

The volumetric efficiency compensation described in FIGS. 3 and 6 is added to the cylinder air amount represented by vertical marker 404 to provide compensated cylinder air amount as indicated by vertical marker 406. The amount of cylinder air amount compensation is represented by arrow 420. The compensated estimated cylinder exhaust gas dilution is determined as the difference between the value of curve 430 at the intersection with vertical marker 406 and the value of curve 431 at the intersection with vertical marker 408. The compensated estimated cylinder exhaust gas dilution is indicated by arrow 424.

The cylinder air amount compensation shown in FIG. 4 impacts estimated MAP by providing an increased cylinder air amount for a lower MAP. Thus, the compensated cylinder air amount is determined from a base cylinder air amount as determined from MAP added to an amount of cylinder air amount compensation.

Referring now to FIG. 5, a plot illustrating thermal compensation for cylinder volumetric efficiency impacting MAP is shown. The method described herein is executable via instructions of a controller in a system such as in FIG. 1 and useful for systems that measure MAP and is included in the method of FIG. 6.

The X axis represents cylinder air amount and cylinder air amount increases from the left side of the plot to the right side of the plot. The Y axis represents MAP and MAP increases from the X axis in the direction of the Y axis arrow. Vertical marker 550 indicates where air blow-through can occur. Specifically, blow-through can occur when cylinder air flow is greater than or to the right of the level indicated by vertical marker 550. Blow-thorough is not present during cylinder air flows that are to the left of vertical marker 550.

In the example of FIG. 5, volumetric efficiency compensation for valve temperature changes during a load change from a lower load to a higher load where valve temperature increases is shown. In this example, the cylinder air amount increases due to compensation for increasing valve temperature.

Further in this example, cylinder air amount increases from a low level to the level shown by vertical marker 508. Vertical marker 508 represents a mapped base cylinder air amount that is uncompensated and determined via a mass air flow meter, for example. MAP may be estimated at a level shown by horizontal marker 502 by indexing a table or function to output MAP at the level of 502 based on cylinder air amount at 508 according to curve 530 (e.g. a mapped non-blow-through curve describing cylinder volumetric efficiency based on MAP and cylinder air amount). The base estimated cylinder exhaust gas dilution is determined as the difference between the value of curve 530 at 508 and the value of curve 531 at 510, where curve 531 represents the maximum level or theoretical cylinder volumetric efficiency. The base estimated cylinder exhaust gas dilution is indicated by arrow 522.

The volumetric efficiency compensation described in FIGS. 3 and 6 is added to the cylinder air amount represented by vertical marker 508 to compute a temporary cylinder air amount that is the basis for revising MAP. The temporary cylinder air amount is indicated by vertical marker 506 and is not a basis for adjusting the cylinder fuel amount. The amount of cylinder air amount compensation is represented by arrow 520. MAP at the level of 504 is determined via indexing curve 530 using the temporary cylinder air amount. The compensated estimated cylinder exhaust gas dilution is determined as the difference between the value of curve 530 at the intersection with vertical marker 506 and the value of curve 531 at the intersection with vertical marker 511. The compensated estimated cylinder exhaust gas dilution is indicated by arrow 524.

Referring now to FIG. 6, a method for compensating for exhaust valve timing changes during transient conditions due to thermal conditions is shown. The method of FIG. 6 is executable via instructions of a controller in a system as shown in FIG. 1.

At 602, method 600 determines engine operating conditions. Engine operating conditions may include but are not limited to engine speed, engine load, engine intake manifold pressure, engine air flow rate, engine temperature, and cam position. Method 600 proceeds to 604 after engine operating conditions are determined.

At 604, method 600 judges whether cylinder air amount is based on MAP or MAF sensor inputs. If cylinder air amount is based on MAP YES is answered at 604 and method 600 proceeds to 606. Otherwise, NO is answered at 604 and method 600 proceeds to 608.

At 608, method 600 determines a base cylinder air amount from a mass air flow (MAF) sensor, and MAP is determined via indexing a table or function that includes a cylinder volumetric efficiency relationship curve according to a MAP cylinder air amount relationship (e.g., curve 530 of FIG. 5) using cylinder air amount as determined from the MAF sensor. The table outputs a base MAP. Further, a base cylinder exhaust gas residual may be determined via subtracting a cylinder air amount determined from the cylinder volumetric efficiency relationship curve (e.g., curve 530 of FIG. 5) from a maximum cylinder air amount determined from a theoretical cylinder air amount curve (e.g., 531 and residual amount 524 of FIG. 5) at the MAP level determined from cylinder air amount. Method 600 proceeds to 610 after based values of cylinder air amount, MAP, and cylinder exhaust gas residual are determined.

At 606, method 600 determines a base cylinder air amount from a MAP sensor via indexing a table or function that includes a cylinder volumetric efficiency relationship curve according to a MAP cylinder air amount relationship (e.g., curve 430 of FIG. 4) using MAP. The table outputs a base cylinder air amount. Further, a base cylinder exhaust gas residual may be determined via subtracting a cylinder air amount determined from the cylinder volumetric efficiency relationship curve from a maximum cylinder air amount determined from a theoretical cylinder air amount curve (e.g., curve 431 of FIG. 4 and residual amount 422) from the MAP determined from the MAP sensor. Method 600 proceeds to 610 after based values of cylinder air amount, MAP, and cylinder exhaust gas residual are determined.

At 610, method 600 judges whether or not blow-through is present at the current engine operating conditions. In one example, blow-through may be determined when air flow into a cylinder exceeds a cylinder air amount described by a maximum cylinder volumetric efficiency curve (e.g., to the right of vertical marker 550 of FIG. 5). For example, if the cylinder air amount from curve 530 at a MAP level is subtracted from the maximum cylinder volumetric efficiency curve 531 for cylinder air flow at a level to the right of vertical marker 550 of FIG. 5 and the result is negative, blow-thorough may be determined. Method 300 proceeds to 614 if blow-through is not determined and the blow-through amount is set to zero. Otherwise, if the answer at 610 is yes, method 600 proceeds to 612.

At 612, method 600 determines the amount of blow-through. A blow-through amount may be determined via subtracting a maximum cylinder air amount at a MAP level from a cylinder air amount at the same MAP level when the cylinder air amount is greater than a cylinder air amount at an intersection of a maximum cylinder air amount curve and a volumetric efficiency curve that represents a cylinder air amount MAP relationship during mapped engine operating conditions where engine temperature and cylinder valve temperature have time to stabilize. For example, at a constant level of MAP greater than MAP at the location where vertical marker 550 intersects curve 531 in FIG. 5, subtracting a cylinder air amount as determined from a maximum cylinder air amount curve 531 of FIG. 5 from cylinder air amount determined from curve 530 of FIG. 5. Method 600 proceeds to 616 after the blow-through amount is determined.

At 614, method 600 determines a base gain amount for adjusting cylinder air amount. The base gain amount may be empirically determined and stored in memory that is indexed according to engine speed and load, for example. Method 600 proceeds to 616 after the base gain amount is determined.

At 616, method 600 determines a rate of change of engine or cylinder air flow rate. In one example, the rate of change of engine or cylinder air flow rate may be determined via subtracting a filtered value of engine or cylinder air flow rate from the engine or cylinder air flow rate. In other example, other approaches such as taking a derivative of cylinder air flow rate may also be used to determine the rate of change of engine or cylinder air flow rate. Method 600 proceeds to 618 after the rate of change of engine or cylinder air flow rate is determined.

At 618, method 600 looks up empirically determined gain adjustments for intake and exhaust valve overlap duration, intake and exhaust valve overlap position relative to crankshaft position, engine speed, and engine load. The gain adjustments may be empirically determined and stored in table and/or functions that are indexed via intake and exhaust valve overlap duration, intake and exhaust overlap position relative to crankshaft position, engine speed and engine load. Method 600 proceeds to 620 after gain adjustments are determined at 618.

At 620, method 600 multiplies the base gain, blow-through amount, rate of change of engine or cylinder air flow rate, and gain adjustments from 618 to determine the volumetric efficiency correction that is to be added to the cylinder air amount. During conditions where blow-through is zero, the base gain from 614 is multiplied by the rate of change of engine or cylinder air flow rate and the gain adjustments from 618. When blow-through is present, the blow-through amount is multiplied by the rate of change of engine or cylinder air flow rate, and the gain adjustments from 618 without using the base gain amount of 614. Method 600 proceeds to 622 after the volumetric efficiency correction is determined.

At 622, method 600 adjusts MAP, cylinder air amount, and cylinder residual gas amount. The cylinder air amount is adjusted via adding the volumetric efficiency correction from 620 to the cylinder air amount as determined at 606 or 608.

MAP is adjusted for systems that sense engine air flow rate and infer MAP. In one example, MAP is adjusted as is described in the description of FIG. 5. In particular, the cylinder air amount is first measured and then compensation is added to the cylinder air amount to account for thermal conditions. The adjusted cylinder air amount is then used to index a curve in a table or function that represents MAP versus cylinder air amount during mapped engine conditions (e.g., curve 530 of FIG. 5). The table or function outputs the adjusted MAP value.

Cylinder air amount is adjusted for systems that sense MAP and infer cylinder air amount. In one example, cylinder air amount is adjusted as is described in the description of FIG. 4. In particular, MAP is measured and cylinder air amount is determined via index a curve in a table or function that represents MAP versus cylinder air amount during mapped engine conditions (e.g., curve 430 of FIG. 4). The table or function outputs a base cylinder air amount. The cylinder air amount compensation is determined and added to the base cylinder air amount to provide a compensated cylinder air amount.

Cylinder exhaust residual amounts may be determined as described in the description of FIGS. 4 and 5. For example, at a MAP sensed or determined from cylinder air amount, base cylinder exhaust gas residual amount may be determined by taking a difference between a maximum cylinder air amount and a mapped cylinder air amount as determined from taking a difference between a curve representing a theoretical maximum air amount that the cylinder can hold at a given pressure at intake valve closing (IVC) (e.g., curve 431 of FIG. 4) and a curve representing a cylinder air amount MAP relationship during nominal mapped engine operating conditions where engine temperature and cylinder valve temperature have time to stabilize (e.g., curve 430 of FIG. 4).

Compensated cylinder exhaust residual amounts may be determined as described in the description of FIGS. 4 and 5. For example, at an adjusted MAP, compensated cylinder exhaust gas residual amount may be determined by taking a difference between a maximum cylinder air amount (e.g., curve 431 of FIG. 4) and a mapped cylinder air amount (e.g., curve 430 of FIG. 4) plus cylinder air amount compensation as determined from taking a difference between a curve representing a theoretical maximum air amount that the cylinder can hold at a given pressure at intake valve closing (IVC) and a curve representing a cylinder air amount MAP relationship during nominal mapped engine operating conditions where engine temperature and cylinder valve temperature have time to stabilize. Method 600 proceeds to 624 after MAP, cylinder air amount, and cylinder residual gas amount are adjusted via the volumetric efficiency correction.

During conditions where blow-through is determined at a given MAP level, the amount of blow-through can be revised by adding the volumetric efficiency compensation (e.g, 350 of FIG. 3) to the air flow through the engine at the given MAP level and then subtracting the cylinder air amount described by the maximum cylinder volumetric efficiency curve at the given MAP level.

At 624, method 600 adjusts engine actuators in response to MAP, compensated cylinder air amount, and compensated cylinder exhaust residual amount. In one example, where cylinder air amount is increased, the engine throttle position may be reduced so that a desired engine torque may be provided. For example, throttle position can be adjusted based on an empirically determined throttle map that provides a throttle position for a desired air flow rate. If the engine air flow rate increases due to thermal conditions, the throttle may be closed to reduce cylinder air amount and to provide a desired air flow rate based on the compensated cylinder air amount.

In another example, where the cylinder residual amount increases due to thermal conditions, an opening amount of an EGR valve may be decreased to compensate for the additional amount of cylinder exhaust residual. Specifically, if thermal conditions increase cylinder residuals, the EGR valve opening amount may be decreased according to the pressure across the EGR valve and the amount of increase in cylinder residuals. EGR valve flow is commonly mapped based on pressure drop across the EGR valve and position of the EGR valve so the EGR flow can be reduced proportionally to the increase in EGR flow into the cylinder. Of course, the EGR valve may be opened further when EGR flow into the cylinder decreases so as to better match actual cylinder EGR with desired cylinder EGR. Additionally, position of the EGR valve can be adjusted based on compensated MAP so that EGR flow rate more closely matches desired EGR flow rate. In other words, the flow rate through the EGR valve may be based on adjusted MAP. Additionally, intake and exhaust cam overlap can be adjusted to increase or decrease cylinder exhaust gas residual based on the compensated cylinder exhaust residual amount.

Spark timing may also be adjusted via an ignition system for compensated cylinder air amount and cylinder exhaust residuals. In particular, the spark is provided at a crankshaft angle that is based on compensated cylinder air amount and engine speed. Further, spark may be further adjusted according to a table that accounts for cylinder exhaust gas residual amount, and the table is indexed via the compensated cylinder exhaust gas residual amount so that spark is adjusted according to compensated cylinder exhaust gas residual amount.

Fuel injector injection amount may also be adjusted according to the compensated cylinder air amount. For example, if the compensated cylinder air amount increases, fuel injection amount may be increased to provide a desired engine air-fuel ratio Likewise, if the compensated cylinder air amount decreases, fuel injection amount may be decreased to provide a desired engine air-fuel ratio.

During conditions where the blow-through amount increases or decreases, blow-through may be adjusted. In one example, if a change in engine thermal conditions increases an amount of engine blow-through (e.g., when air flow into a cylinder exceeds a cylinder air amount described by a maximum cylinder volumetric efficiency curve) blow-through may be reduce via partially closing the throttle or reducing boost pressure. Method 600 proceeds to exit after engine actuators are adjusted.

Thus, the methods of FIGS. 3 and 6 provide for compensating for thermal conditions during transient engine conditions, comprising: adjusting an engine air amount parameter and a cylinder residual gas amount via an engine MAP and cylinder air amount volumetric efficiency relationship in response to a rate of change of cylinder air amount; and adjusting output of an engine actuator in response to the engine air amount parameter. The method may be particularly useful for providing compensating due to valve timing changes resulting from temperature change.

The method also includes where the engine actuator is a fuel injector, and where the engine air amount parameter is based on a curve empirically determined from a plurality of engine MAP and cylinder air amount readings. The method further includes where the engine air amount parameter is adjusted in response to a curve representing engine volumetric efficiency in a MAP versus cylinder air amount space, and where the curve accounts for residual exhaust gas. In some examples, the method includes where the engine actuator is an air inlet throttle, and further comprising adjusting a position of an EGR valve in response to the cylinder residual gas amount. The method also includes where the rate of change of cylinder air amount is determined via a difference between an air flow rate and a filtered air flow rate. The method further comprises adjusting the engine air amount parameter in response to engine cam timing. The method also includes where the engine air amount parameter is a cylinder air amount estimate and where the cylinder air amount estimate is reduced when an engine temperature transitions from a higher temperature to a lower temperature, and where the engine temperature is a temperature of a valve of a cylinder.

In another example, the methods of FIGS. 3 and 6 provide for a method compensating for thermal conditions during transient engine conditions, comprising: adjusting an engine air amount parameter and a cylinder residual gas amount during a condition of blow-through in response to a rate of change of cylinder air amount; and adjusting an output of an engine actuator in response to the engine air amount parameter. The method also includes where the condition of blow-though is estimated from to a difference between a total cylinder air mass flow curve and a maximum volumetric efficiency curve. The method also includes where the engine air amount parameter is adjusted based on a blow-through air estimate.

In one example, the method includes where the engine air amount parameter is a cylinder air amount estimate and where the cylinder air amount estimate is increased when an engine temperature transitions from a lower temperature to a higher temperature, and where the engine temperature is a temperature of a valve of a cylinder. In this way, changes due to valve temperature may be compensated. The method also includes where the engine actuator is an ignition coil, and where the output of the ignition coil is a spark timing. The method also includes where the engine actuator is a throttle, and where the output of the throttle is a position of a throttle plate. The method further comprises adjusting a blow-through amount in response to a rate of change of cylinder air amount.

As will be appreciated by one of ordinary skill in the art, the method described in FIGS. 3 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method compensating for thermal conditions during transient engine conditions, comprising:
    adjusting an engine air amount parameter and a cylinder residual gas amount in response to a rate of change of cylinder air amount, the engine air amount parameter and cylinder residual gas amount adjusted via an engine MAP and cylinder air amount volumetric efficiency relationship; and
    adjusting output of an engine actuator in response to the engine air amount parameter.

2. The method of claim 1, where the engine actuator is a fuel injector, and where the engine air amount parameter is based on a curve empirically determined from a plurality of engine MAP and cylinder air amount readings, and where the engine air amount parameter is one or more of a cylinder air amount and a blow-through air amount.

3. The method of claim 1, where the engine air amount parameter is adjusted in response to a curve representing engine volumetric efficiency in a MAP versus cylinder air amount space, and where the curve accounts for residual exhaust gas.

4. The method of claim 3, where the engine actuator is an air inlet throttle, and further comprising adjusting a position of an EGR valve in response to the cylinder residual gas amount.

5. The method of claim 1, where the rate of change of cylinder air amount is determined via a difference between an air flow rate and a filtered air flow rate.

6. The method of claim 5, further comprising adjusting the engine air amount parameter in response to engine cam timing.

7. The method of claim 1, where the engine air amount parameter is a cylinder air amount estimate and where the cylinder air amount estimate is reduced when an engine temperature transitions from a higher temperature to a lower temperature, and where the engine temperature is a temperature of a valve of a cylinder, and where the cylinder air amount estimate is reduced as time increases after a transient emulating a valve thermal transient.

8. A method compensating for thermal conditions during transient engine conditions, comprising:
adjusting an engine air amount parameter and a cylinder residual gas amount during a condition of blow-through in response to a rate of change of cylinder air amount; and
adjusting an output of an engine actuator in response to the engine air amount parameter.

9. The method of claim 8, where the condition of blow-though is estimated from a difference between a total cylinder air mass flow curve and a volumetric efficiency curve.

10. The method of claim 8, where the engine air amount parameter is adjusted based on a blow-through air estimate.

11. The method of claim 8, where the engine air amount parameter is a cylinder air amount estimate and where the cylinder air amount estimate is increased when an engine temperature transitions from a lower temperature to a higher temperature, and where the engine temperature is a temperature of a valve of a cylinder.

12. The method of claim 8, where the engine actuator is an ignition system, and where the output of the ignition system is a spark timing.

13. The method of claim 8, where the engine actuator is a throttle, and where the output of the throttle is a position of a throttle plate.

14. The method of claim 8, further comprising adjusting a blow-through amount in response to a rate of change of cylinder air amount.

15. An engine system, comprising:
an engine;
a turbocharger coupled to the engine; and
a controller including instructions for adjusting an engine air amount parameter and a cylinder residual gas amount in response to a rate of change of cylinder air amount flow during blow-through conditions with positive intake-exhaust valve overlap and non-blow-through conditions without positive intake-exhaust valve overlap, the controller including further instructions for adjusting an actuator in response to the engine air amount parameter.

16. The engine system of claim 15, where the rate of change of cylinder air amount flow is determined from a difference between engine air flow and filtered engine air flow.

17. The engine system of claim 15, further comprising additional instructions for adjusting the engine air amount parameter in response to cam timing.

18. The engine system of claim 15, further comprising additional instructions for adjusting the engine air amount parameter in response to engine speed and engine load.

19. The engine system of claim 18, further comprising additional instructions to determine blow-through during cylinder air flow conditions where cylinder air flow is greater than a cylinder air flow at an intersection of a maximum volumetric efficiency curve and a non-blow-through curve.

* * * * *